United States Patent
Dunn

(10) Patent No.: US 10,833,564 B2
(45) Date of Patent: Nov. 10, 2020

(54) ELECTRIC MACHINE TEMPERATURE SENSOR

(71) Applicant: Ford Global Technologies, LLC, Dearborn, MI (US)

(72) Inventor: Casey Taylor Dunn, Brownstown Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 16/277,440

(22) Filed: Feb. 15, 2019

(65) Prior Publication Data

US 2020/0266689 A1  Aug. 20, 2020

(51) Int. Cl.
| | |
|---|---|
| *H02K 11/25* | (2016.01) |
| *H02K 3/12* | (2006.01) |
| *H02K 5/00* | (2006.01) |
| *H02K 3/48* | (2006.01) |
| *H02K 1/16* | (2006.01) |

(52) U.S. Cl.
CPC .............. *H02K 11/25* (2016.01); *H02K 1/16* (2013.01); *H02K 3/12* (2013.01); *H02K 3/48* (2013.01); *H02K 5/00* (2013.01)

(58) Field of Classification Search
CPC . H02K 11/25; H02K 1/16; H02K 5/00; H02K 3/12; H02K 3/48
USPC ............................................. 310/68 B, 68 C
See application file for complete search history.

(56) References Cited

U.S. PATENT DOCUMENTS

| | | | | |
|---|---|---|---|---|
| 4,734,602 A | * | 3/1988 | Hauser .................... | H02K 11/25 310/68 C |
| 4,894,571 A | * | 1/1990 | Hildebrandt ......... | H01H 61/002 310/68 C |
| 4,914,329 A | * | 4/1990 | Ottersbach ........... | H01H 37/043 310/68 C |
| 5,733,044 A | * | 3/1998 | Rose ....................... | G01K 13/02 374/144 |
| 6,153,954 A | | 11/2000 | Uchida et al. | |
| 7,633,197 B2 | * | 12/2009 | Isoda ..................... | H02K 11/25 310/68 C |
| 7,768,165 B2 | * | 8/2010 | Scott ....................... | H02K 3/12 310/71 |
| 8,803,378 B2 | * | 8/2014 | Sonohara ............... | H02K 5/225 310/53 |
| 2013/0270973 A1 | * | 10/2013 | Ikemoto ................. | H02K 11/25 310/68 C |
| 2014/0184031 A1 | * | 7/2014 | Kaneshige ............. | H02K 11/25 310/68 B |

(Continued)

FOREIGN PATENT DOCUMENTS

| | | |
|---|---|---|
| DE | 102015006345 A1 | 11/2015 |
| DE | 102014210724 A1 | 12/2015 |
| FR | 2995741 A1 | 3/2014 |

*Primary Examiner* — John K Kim
(74) *Attorney, Agent, or Firm* — David B. Kelley; Brooks Kushman P.C.

(57) ABSTRACT

An electric machine includes a stator having hairpin windings with at least first and second phases and a neutral bridge attached to the at least first and second phases. The neutral bridge defines a planar body and a mounting feature extending from an upper surface of the body and cooperating with the body to define an opening. A temperature sensor of the electric machine includes an insertion portion having a sensing element. The insertion portion is received in the opening.

19 Claims, 4 Drawing Sheets

(56) References Cited

U.S. PATENT DOCUMENTS

2015/0381002 A1* 12/2015 Hashimoto .............. H02K 3/28
  310/71
2019/0074103 A1* 3/2019 Knerr ....................... H02K 3/32
2020/0266689 A1* 8/2020 Dunn ....................... H02K 3/12

* cited by examiner

ELECTRIC MACHINE TEMPERATURE SENSOR

TECHNICAL FIELD

The present disclosure relates to thermal management systems for electric machines of electrified vehicles and more specifically to temperature sensors for measuring temperatures of electric machines.

BACKGROUND

Extended drive range technology for electrified vehicles, such as battery electric vehicles and plug-in hybrid vehicles ("PHEVs"), is continuously improving. Achieving these increased ranges, however, often requires traction batteries and electric machines to have higher power outputs, and associated thermal management systems to have increased capacities in comparison to previous BEVs and PHEVs.

SUMMARY

According to one embodiment, an electric machine includes a stator having hairpin windings with at least first and second phases and a neutral bridge attached to the at least first and second phases. The neutral bridge defines a planar body and a mounting feature extending from an upper surface of the body and cooperating with the body to define an opening. A temperature sensor of the electric machine includes an insertion portion having a sensing element. The insertion portion is received in the opening.

According to another embodiment, an electric machine includes a stator having windings and an electrical bridge attached to the windings. The bridge includes a planar body and an integral mounting feature extending from an upper surface of the body and cooperating with the body to define an opening. A temperature sensor of the electric machine includes an insertion portion having a sensing element. The insertion portion is received in the opening.

According to yet another embodiment, an electric machine includes a stator having a stator core defining a plurality of slots and hairpin windings disposed in the slots. An electrical bridge is attached to the windings and includes a planar body and an integrally formed arch portion extending from an upper surface of the body and cooperating with the body to define an opening. A temperature sensor includes a base and a sensor head having a sensing element and being received in the opening with the sensing element adjacent to the upper surface. The sensor head has a deflectable locking feature projecting from the sensor head and engageable with the arch portion. The base and the locking feature sandwich the arch portion to secure the temperature sensor in place.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
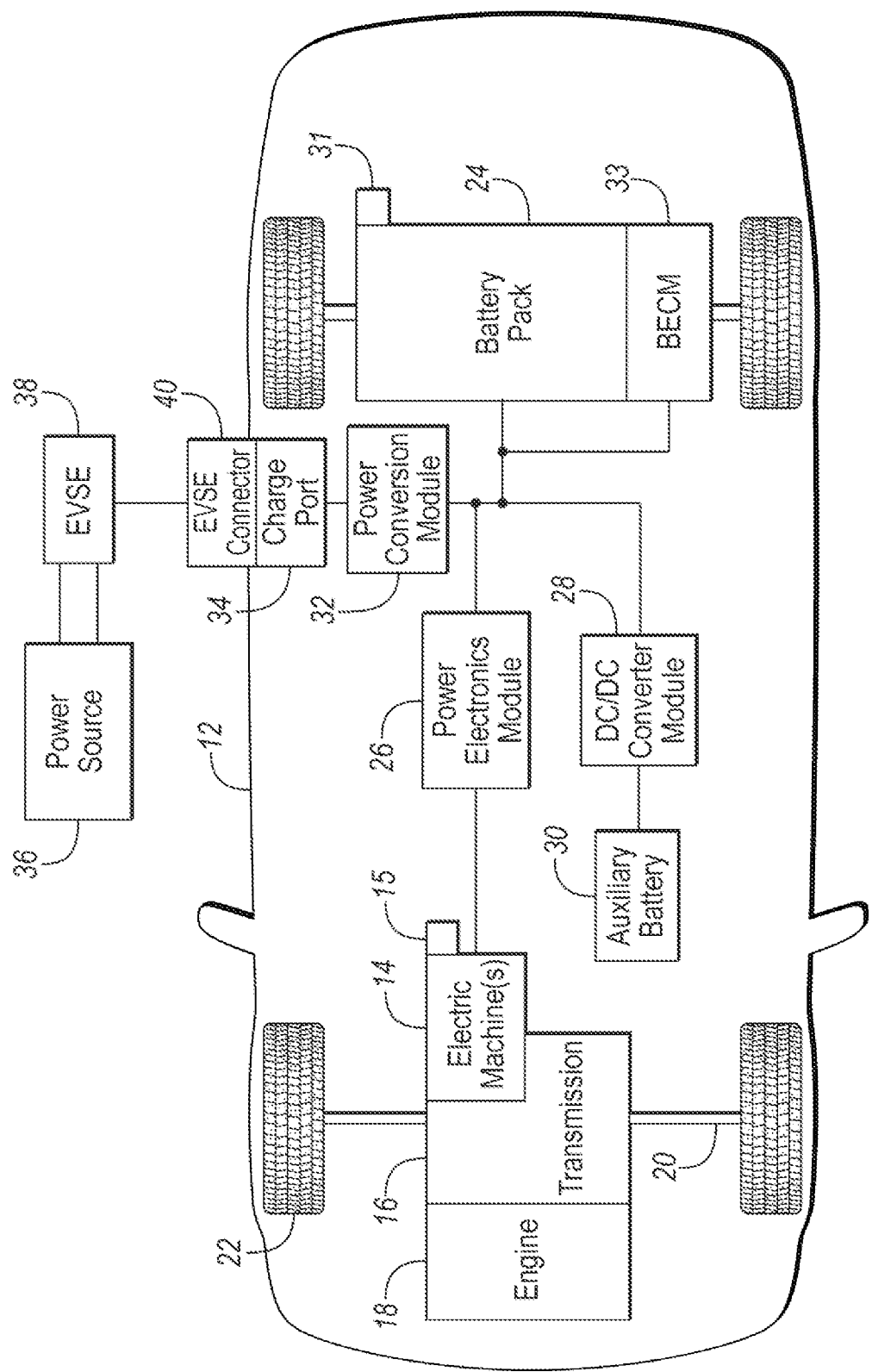
FIG. 1 is a schematic diagram illustrating an example electrified vehicle.

FIG. 1 depicts a schematic of an example of a PHEV 12. While FIG. 1 depicts a PHEV, embodiments within the scope of the present invention may be implemented in a non-plugin hybrid electric vehicle, mild-hybrid electric vehicle, fully electric vehicle, or other types of vehicles as appropriate.

The vehicle 12 may include one or more electric machines 14 mechanically connected to a hybrid transmission 16. The electric machine 14 may be capable of operating as a motor and/or a generator. In addition, the hybrid transmission 16 may be mechanically connected to an engine 18. The hybrid transmission 16 may also be mechanically connected to a drive shaft 20 that is mechanically connected to the wheels 22. The electric machines 14 may provide propulsion and deceleration capability when the engine 18 is turned ON or OFF. The electric machines 14 may also act as generators and may provide fuel economy benefits by recovering energy that would normally be lost as heat in the friction-braking system. The electric machines 14 may also provide reduced pollutant emissions since the hybrid-electric vehicle 12 may be operated in electric mode or hybrid mode under certain conditions to reduce overall fuel consumption of the vehicle 12.

As discussed in greater detail below, the electric machine 14 may have a temperature sensor 15 such as a thermistor or other type of temperature sensor. The temperature sensor 15 may be in communication with a controller or module 33 to provide temperature data regarding the electric machine 14. The controller 33 may be an inverter system controller (ISC) or battery electrical control module (BECM). The temperature sensor 15 may also, or instead, be in communication with one or more power electronics modules (e.g., PEM 26). It is also contemplated that more than one temperature sensor 15 may be used to monitor temperature of the electric machine(s) 14.

A traction battery or battery pack 24 stores and provides energy that may be used by the electric machines 14. The traction battery 24 may provide a high-voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The ISC and/or power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the engine 18 is not present, and the hybrid transmission 16 may be a gear box connected to an electric machine 14.

In addition to providing energy for propulsion, the traction battery 24 may provide energy for other vehicle electrical systems. A DC/DC converter module 28 may convert high-voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

The ISC and/or battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the ISC and/or BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Figure 2:
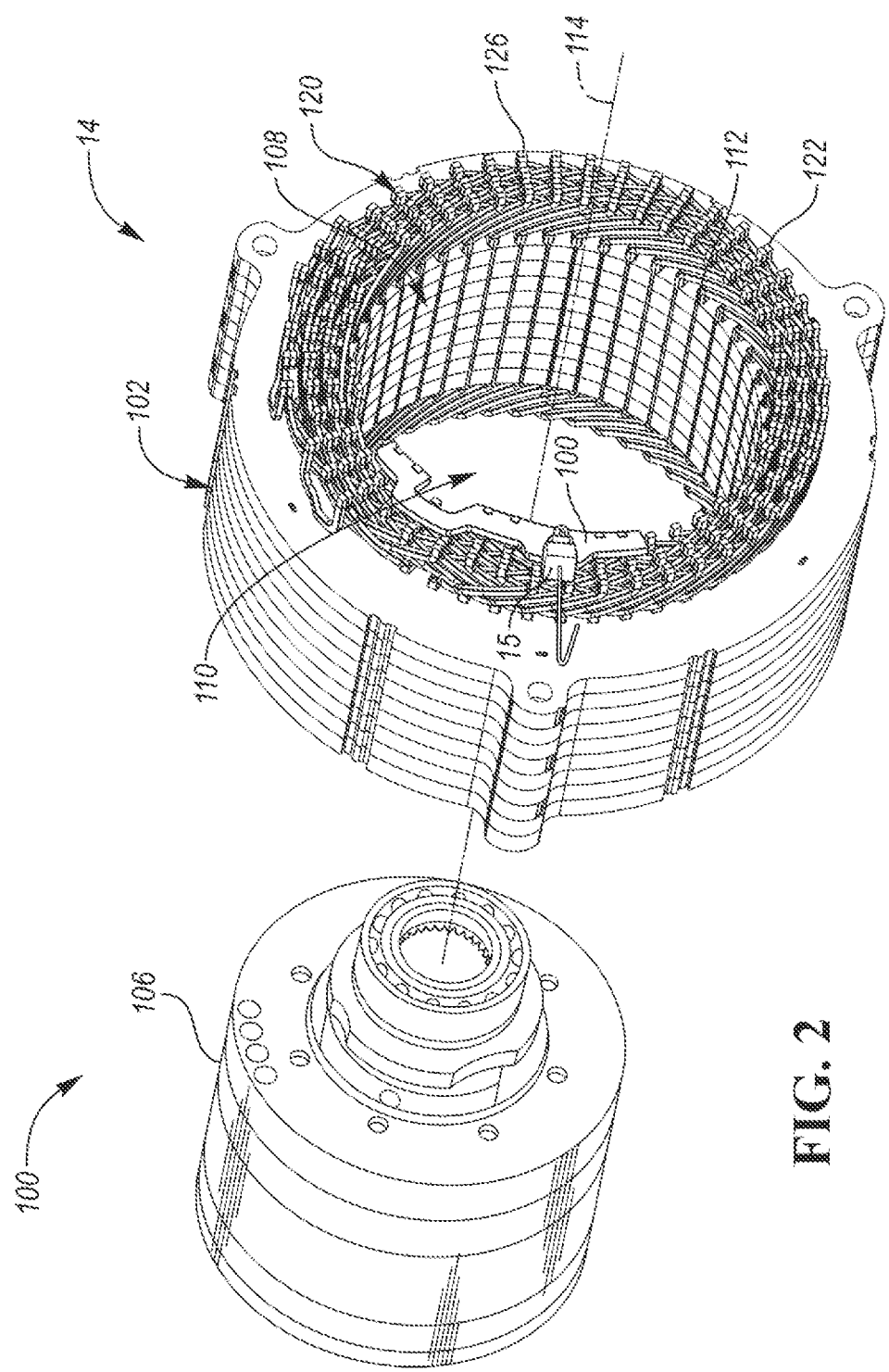
FIG. 2 is an exploded perspective view of an example electric machine.

Referring to FIG. 2, some electrified vehicles may include two such electric machines. One of the electric machines may function primarily as a motor and the other may function primarily as a generator. The motor may operate to convert electricity to mechanical power and the generator may operate to convert mechanical power to electricity. Both, the motor and the generator, however, are capable of acting as a motor and as a generator. One or more of the electric machines 14 may include a stator core 102 and a rotor 106. The stator core 102 may be made from a plurality of steel laminations that are stacked together. The stator core 102 may define an inner surface 108 and a cavity 110. The rotor 106 may be sized for disposal and operation within the cavity 110. A shaft (not shown) may be operably connected to the rotor 106. The stator core 102 may extend about a central axis 114. The rotor 106 may rotate about the central axis 114.

A plurality of slots 112 may be provided along the inner surface 108. The slots 112 may be formed, for example, between a plurality of teeth extending inwardly. Windings 120 may at least partially extend within or be disposed within the slots 112. In at least one approach, the windings 120, per circuit or phase, may be a continuous wire that is disposed into one respective slot 112, turn through 180 degrees near the end of the respective slot 112, then run along another slot 112. Multiple windings may be provided in each slot 112.

The illustrated electric machine 14 includes hairpin windings 120 formed from a plurality of interconnected hairpins 122 and one or more electrical bridges, e.g., jumpers, neutral bridges, etc. The electric machine 14 may be a three-phase AC machine in which the windings include three phases, e.g., U, V, W. Each phase may include one or more paths. Each path is formed of interconnected, e.g., welded, hairpins that form a continuous conductive path from the terminal to the neutral bridge 100. (For the purposes of this application, the neutral bridge 100 may be considered part of the windings.) The hairpins 122 have a cross-section that may be polygonal. More particularly, the cross-section may define a quadrilateral, which may be a parallelogram (e.g., a rectangle, square, rhombus, etc.), trapezoid, kite, etc.

Heating is generated, inter alia, in the windings 120 during operation of the electric machine 14. The windings 120 are one of the more critical components in terms of heat management. The electric machine can fail if the windings overheat. Therefore, sensing the temperature of the windings, or near the windings, may be more advantageous than sensing some other component, e.g., the stator.

As introduced above, the electric machine 14 may include one or more temperature sensors 15. In the illustrated embodiment, a single sensor 15 is provided. The sensor 15 may be a thermistor, thermal couple, or other type of sensor. The sensor 15 may be positioned to measure temperature of the windings 120, for example, by being attached to the neutral bridge 100. The neutral bridge 100 may be connected to all of the parallel paths and therefore receives current regardless of which phase is active. This makes the neutral bridge 100 a good attachment point for measuring temperature of the windings 120. This application is not limited to attaching the temperature sensor to the neutral bridge. The sensor 15 may be connected to other electrical bridges such as jumpers that connect hairpins of a same path.

Figure 3:
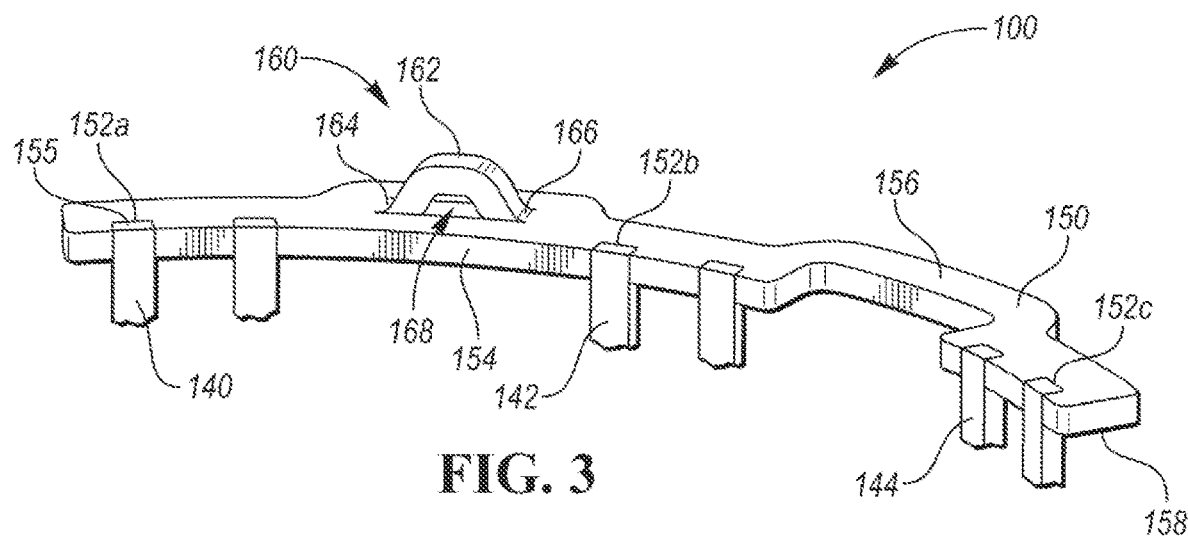
FIG. 3 is a perspective view of a neutral bridge of the electric machine.

Referring to FIG. 3, the neutral bridge 100 may include a planar body 150 that is arcuate to match the curvature of the stator core. The body 150 defines a plurality of hairpin-receiving portions 152, e.g., slots or holes. The hairpin-receiving portions 152 may be recessed into an inner surface 154 of the body 150. The hairpin-receiving portions 152 may extend between an upper surface 156 and a lower surface 158. The terms "upper" and "lower," and the like, when used to describe the parts should not be interpreted to limit the disclosed concept to the illustrated embodiment or any specific spatial orientation. Each of the hairpin-receiving portions 152 is configured to receive an end 155 of a corresponding hairpin therein. For example, a pair of hairpins 140 of the U-phase phase are connected to slots 152*a*, a pair of hairpins 142 of the V-phase phase are connected to slots 152*b*, and a pair of hairpins 144 of the W-phase phase are connected to slots 152*c*.

The neutral bridge 100 includes a mounting feature 160 configured to secure the temperature sensor 15. The mounting feature 160 may be an integrally formed portion of the planar body 150. For example, the neutral bridge 100 may be a stamping and the mounting feature may be a slit and drawn feature. The mounting feature 160 may include an arch portion 162 having a first end 164 and a second end 166. The arch portion 162 cooperates with the upper surface 156 to define an opening 168 sized to receive the temperature sensor 15.

Figure 4:
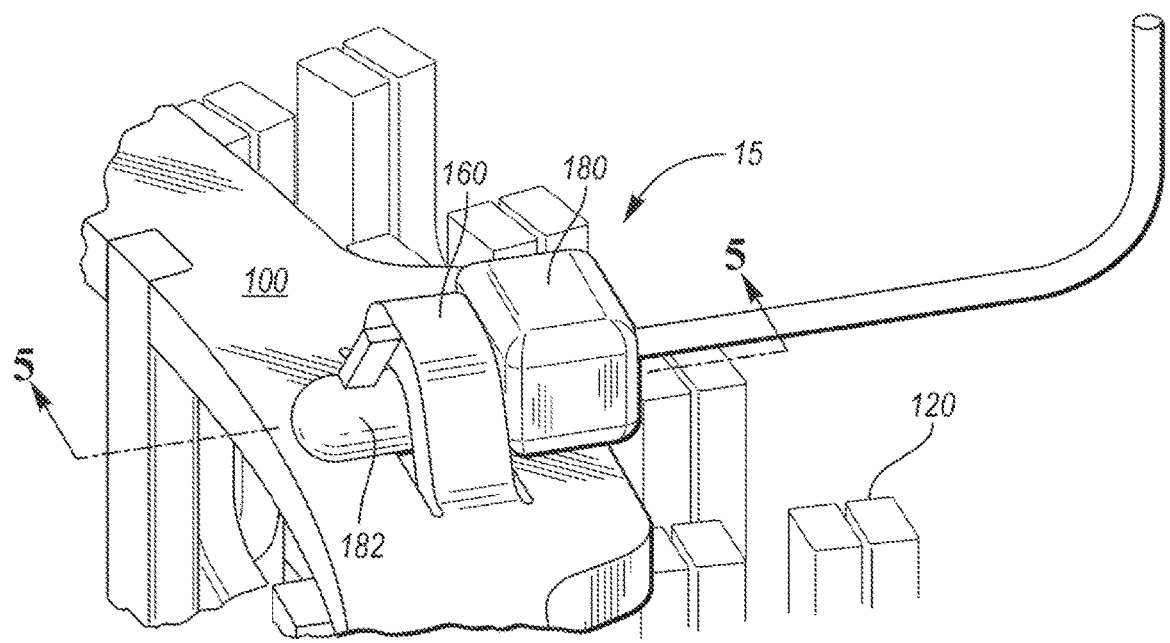
FIG. 4 is a magnified perspective view of the electric machine at area 4-4.
Figure 5:
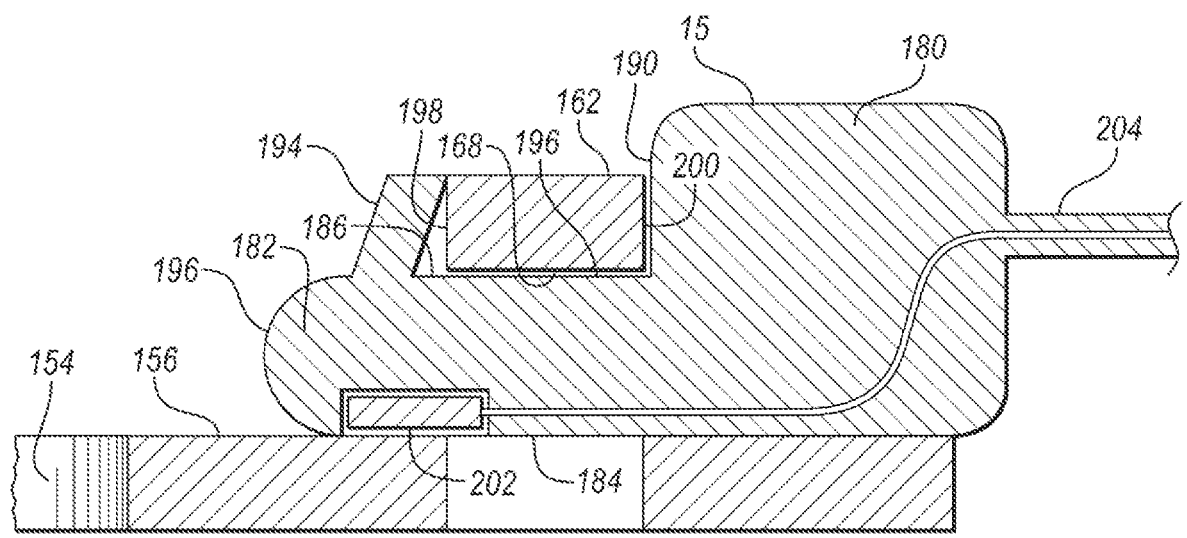
FIG. 5 is a cross-sectional view of the neutral bridge and a temperature sensor attached thereto.

Referring to FIGS. 4 and 5, the temperature sensor 15 may be attached to the neutral bridge 100 by the mounting feature 160. The temperature sensor 15 may include a base 180 and a sensor head (insertion portion) 182 extending from a wall 190 of the base 180. The sensor head 182 may be received in the opening 168 of the mounting feature 160 with a top 186 of the sensor head 182 disposed against an inner surface 192 of the arch portion 162 and a bottom 184 of the sensor head 182 disposed against the upper surface 156 of the neutral bridge 100. To provide a tight fit, the distance between the inner surface 192 and the upper surface 156 may substantially match the distance between the top 186 and the bottom 184 of the sensor head 182. The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±3% of the value or relative characteristic. In some embodiments, the distance between the inner surface 192 and the upper surface 156 may be less than the distance between the top 186 and the bottom 184 of the sensor head 182. The sensor head 182 may be cylindrical having a circular, polygonal, or any other cross-sectional shape. In some embodiments, the bottom 184 may be flat to seat flush with the neutral bridge 100.

The sensor 15 may include a locking feature 194 extending from an outer surface 196 of the sensor head 182. The locking feature 194 may be a deflectable tab configured to deflect when inserted through the opening 168 and spring into a locking position once passing through the mounting feature 160. The locking feature 194 may engage with a front 198 of the arch portion 162 to prevent the sensor 15 from pulling out of the opening 168 when in the locking position. The wall 190 of the base 180 may engage with a back 200 of the arch portion 162. Other types of locking features may be used such as clips, detents, and the like.

A sensing element 202 is disposed within the sensor head 182. The sensing element 202 may be disposed near the bottom 184 to be in close proximity to the upper surface 156 of the neutral bridge 100. The sensor head 182 may be over-molded to the sensing element 202. A lead wire 204 connects the sensing element 202 to the controller either directly or through one or more intermediate components or data buses. The sensing element 202 may be a thermistor, a thermal couple, or other type of temperature sensor.

Figure 6:
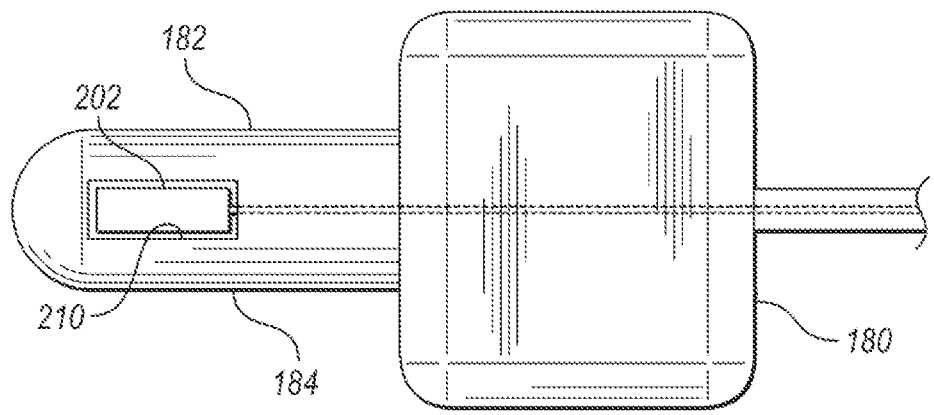
FIG. 6 is a bottom view of the temperature sensor.

Referring to FIG. 6, the sensor head 182 may define an open bottom and the sensing element 202 is located within the open bottom. For example, the bottom 184 of the sensor head 182 may define an opening 210 and the sensor element 202 is disposed within the opening 210 such that the sensing element 202 is in contact with the upper surface 156 of the neutral bridge 100. Providing the opening 210 may improve accuracy of the sensing element 202. The opening 210 is an optional feature and some sensor heads 182 may include a wall, e.g., formed of plastic, disposed between the bottom 184 and the sensing element 202.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine comprising:
a stator including hairpin windings formed of interconnected hairpins arranged at least first and second phases of the electric machine and a neutral bridge attached to the at least first and second phases, the neutral bridge having a planar body defining at least first and second hairpin openings and a mounting feature extending from an upper surface of the body and cooperating with the body to define a temperature-sensor opening, wherein the first opening receives one of the hairpins of the first phase therein and the second opening receives one of the hairpins of the second phase therein; and
a temperature sensor including an insertion portion having a sensing element, the insertion portion being received in the temperature-sensor opening.

2. The electric machine of claim 1, wherein the insertion portion is in contact with the upper surface.

3. The electric machine of claim 1, wherein the mounting feature is integrally formed with the neutral bridge.

4. The electric machine of claim 1, wherein the mounting feature is arch-shaped.

5. The electric machine of claim 1, wherein the insertion portion further has a locking feature configured to engage with the mounting feature.

6. The electric machine of claim 5, wherein the locking feature is a deflectable tab.

7. The electric machine of claim 5, wherein the temperature sensor further includes a base and the insertion portion extends from the base, wherein the locking feature is adjacent a backside of the mounting feature and the base is adjacent a frontside of the mounting feature.

8. The electric machine of claim 1, wherein the sensing element is a thermistor.

9. The electric machine of claim 1, wherein the insertion portion includes an open bottom and the sensing element is located within the open bottom.

10. The electric machine of claim 9, wherein the sensing element is a thermistor that is in contact with the upper surface.

11. The electric machine of claim 1, wherein a height of the opening substantially matches a height of the insertion portion.

12. An electric machine comprising:
a stator including windings and an electrical bridge attached to the windings, wherein the bridge includes a planar body and an integral mounting feature extending from an upper surface of the body and cooperating with the body to define an opening; and
a temperature sensor including an insertion portion having a sensing element, the insertion portion being received in the opening, wherein the insertion portion further has a locking feature configured to engage with the mounting feature and a base, wherein the insertion portion extends from the base, and the locking feature is adjacent a backside of the mounting feature and the base is adjacent a frontside of the mounting feature.

13. The electric machine of claim 12, wherein the insertion portion is in contact with the upper surface.

14. The electric machine of claim 12, wherein the mounting feature is an arch portion of the electrical bridge.

15. The electric machine of claim 12, wherein the bridge is a neutral bridge.

16. The electric machine of claim 12, wherein a height of the opening substantially matches a height of the insertion portion.

17. The electric machine of claim 12, wherein the insertion portion is cylindrical.

18. An electric machine comprising:
a stator including a stator core defining a plurality of slots and hairpin windings disposed in the slots;
an electrical bridge attached to the windings, the electrical bridge including a planar body and an integrally formed arch portion extending from an upper surface of the body and cooperating with the body to define an opening; and
a temperature sensor including
a base,
a sensor head having a sensing element and being received in the opening with the sensing element adjacent to the upper surface, and
a deflectable locking feature projecting from the sensor head and engageable with the arch portion, wherein the base and the locking feature sandwich the arch portion to secure the temperature sensor in place.

19. The electric machine of claim 18, wherein the sensor head is in contact with the upper surface.

* * * * *